A. DENIS.
DEMOUNTABLE RIM.
APPLICATION FILED OCT. 7, 1911.
1,056,156. Patented Mar. 18, 1913.
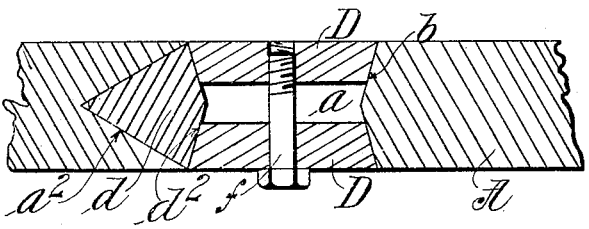
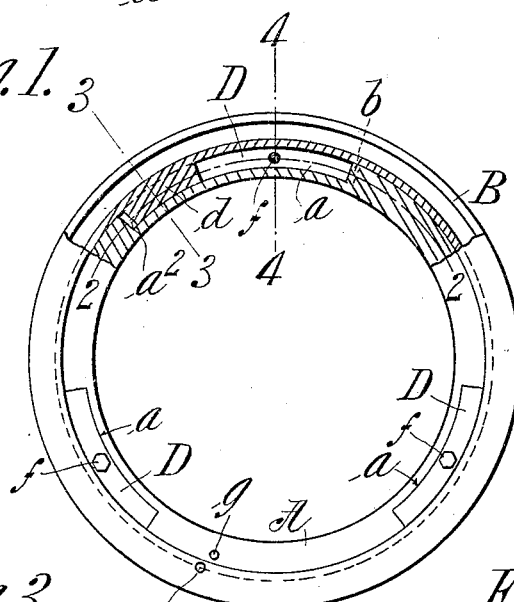
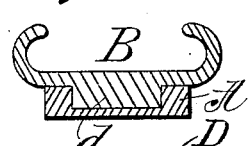
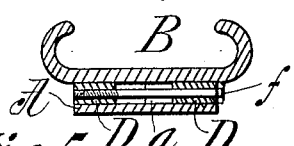
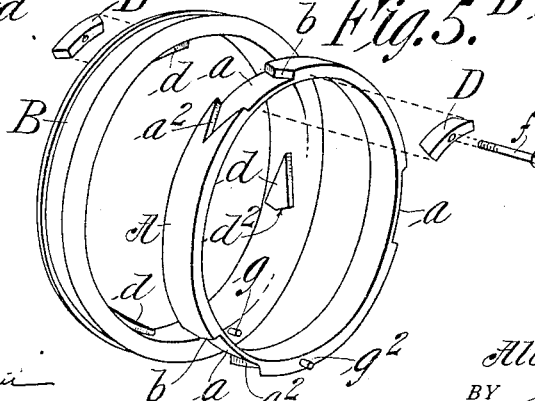
WITNESSES:
INVENTOR,
Albert Denis,
BY
ATTORNEY.

UNITED STATES PATENT OFFICE.

ALBERT DENIS, OF SPRINGFIELD, MASSACHUSETTS.

DEMOUNTABLE RIM.

1,056,156.  Specification of Letters Patent.  Patented Mar. 18, 1913.

Application filed October 7, 1911. Serial No. 653,318.

*To all whom it may concern:*

Be it known that I, ALBERT DENIS, a British subject, and resident of Springfield, in the county of Hampden and State of Massachusetts, have invented certain new and useful Improvements in Demountable Rims, of which the following is a full, clear, and exact description.

The object of this invention is to so construct and combine the main rim of an automobile and a demountable tire carrying rim and to provide means for securing the demountable rim on the felly, that the application and confinement of the demountable rim may be most quickly, conveniently and securely effected as well as its removal for replacement by another similar rim, as occasion may require. And in the carrying out of the invention an aim is to provide in the engaging and confining devices means of such character that when the demountable rim is in place there can be no possibility of its creeping circumferentially on the felly or becoming in any degree transversely displaced.

The invention is described in the accompanying drawings and is set forth in the claim.

In the drawings:—Figure 1 is a side elevation of an automobile felly and its demountable rim with parts shown in vertical section for clearer illustration. Fig. 2 is a partial sectional view as taken on line 2—2, Fig. 1. Figs. 3 and 4 are cross sections on lines 3—3 and 4—4, Fig. 1, and Fig. 5 is a perspective view of the disassembled felly, rim and key blocks.

Similar characters of reference indicate corresponding parts in all of the views.

In the drawings, A represents the permanent main rim of a wheel constructed with a plurality of depressions or recesses $a$ within its periphery at regularly spaced distances apart. In practice three of the recesses $a$ are shown at "thirds", the same opening to the opposite edges of the rim and having each a convergent or V-shaped recess extension $a^2$ at one end while the other end boundary of each recess $a$ is formed by an obtusely angular shoulder $b$.

The demountable rim B,—which may be of any desired type, as, for instance, a clencher rim,—has a plurality of integral or permanently affixed lugs or tongues $d$ $d$ on its inner surface, which are of V-shape, corresponding to the convergence of the recess extension $a^2$, the lengths of which are less than the lengths of the lateral openings of the recesses $a$ at the edges of the felly, and the butt ends of which are of an obtuse angular form, as shown at $d^2$, and preferably of angularity corresponding to that of the recess end forming shoulders $b$. The rim is brought to engagement with the felly by relative transverse movements of these parts when the tongues $d$ have matching relation with the recesses $a$, and when the rim acquires its encircling engagement about the felly the rim is rotatively moved so that the V-shaped tongues are moved into the convergent recess extensions $a^2$ with their butt ends $d^2$ projecting slightly into the recesses $a$. And for the retention of the rim on the felly, pairs of key blocks D D are inserted in the recesses $a$ of the felly at opposite edges of the latter. The opposite end edges of these key blocks are obtusely angular to each other, as shown, and have engagements both with the shoulders $b$ formed on the felly and the obtusely angular butt end $d^2$ of the tongues $d$. As means for the confinement of the pairs of key blocks, those here shown consist in screws $f$, one for each pair, each screw passing through one of the key blocks, and having its head in engagement therewith while its transversely extending shank has a screw thread engagement with the opposite block. Thus, while the key blocks when in their places effectually prevent both circumferential or creeping movements of the rim on the felly and by their angular end formations engaging the shoulders $b$ and the angular butt ends of the tongues or lugs $d$, the retention of the screw blocks themselves is most reliably maintained by the headed screws or bolts.

Inasmuch as the rim after having for a long time remained on the felly, may become rusted, stuck or otherwise set thereon, the felly and rim have integral or permanently affixed edgewise extending studs or dowel like members $g$, $g^2$, at adjacent relations as shown in Figs. 1 and 5 so that by the insertion of a rigid rod or small bar or any suitable available implement between such studs and a prying action thereby (of course when the key blocks shall have been moved), the starting movement circumferentially of the rim relatively to the felly may be conveniently and positively accomplished.

Changes of minor character and as to form, number and arrangement of the parts and coacting features of this device may be made without departing from my invention.

I claim:—

The combination of a fixed rim having a series of recesses extending across the periphery, one end of each recess being formed of two flat walls meeting midway of the edges to form an obtuse angle, the other end of each recess being composed of two walls converging from each side edge to meet at the middle of the rim at an acute angle and form a pocket, a demountable rim fitting the periphery of the said fixed rim and provided with a series of quadrangular lugs corresponding in position to the said recesses in the other rim, the lugs having two faces converging from the side edge of the rim to meet at the middle of the rim periphery and form an acute angle corresponding to the said acute angle of the pocket in the other rim, the other two faces of the lug meeting at the middle of the periphery at an obtuse angle and being spaced from the said acute angled walls of the recesses of the other rim when the lugs are seated in the said pockets of the other rim member, and a pair of key blocks in each of the said recesses one on each side that have convergent ends to engage the said obtuse angled faces and walls of the lugs and recesses respectively at their outer portions, and a screw bolt passing through the key blocks to draw them together in each pair and force the lugs into the pockets to lock the rim members in engagement.

Signed by me at Springfield, Mass., in presence of two subscribing witnesses.

ALBERT DENIS.

Witnesses:
 WM. S. BELLOWS,
 G. R. DRISCOLL.